US012122142B2

(12) United States Patent
Gibson

(10) Patent No.: US 12,122,142 B2

(45) Date of Patent: *Oct. 22, 2024

(54) SCREEN PRINTING METHOD

(71) Applicant: Squee-Geez Inc., Glendale, AZ (US)

(72) Inventor: Chad Gibson, Mesa, AZ (US)

(73) Assignee: Squee-Geez Inc., Glendale, AZ (US)

(*) Notice: Subject to any disclaimer, the term of this patent is extended or adjusted under 35 U.S.C. 154(b) by 142 days.

This patent is subject to a terminal disclaimer.

(21) Appl. No.: 17/650,331

(22) Filed: Feb. 8, 2022

(65) Prior Publication Data

US 2022/0161546 A1 May 26, 2022

Related U.S. Application Data

(63) Continuation-in-part of application No. 16/536,674, filed on Aug. 9, 2019, now Pat. No. 11,241,874.

(51) Int. Cl.

*B41M 1/12* (2006.01)
*B41F 15/34* (2006.01)
*B41M 1/18* (2006.01)

(52) U.S. Cl.

CPC ............... *B41F 15/34* (2013.01); *B41M 1/12* (2013.01)

(58) Field of Classification Search

None

See application file for complete search history.

(56) References Cited

U.S. PATENT DOCUMENTS

| | | | | |
|---|---|---|---|---|
| 5,196,236 | A | 3/1993 | Howard et al. | |
| 5,953,988 | A * | 9/1999 | Vinck | B41M 1/22 101/115 |
| 9,656,475 | B2 | 5/2017 | Miller | |
| 2003/0007164 | A1 * | 1/2003 | Lee | H04N 1/54 358/1.9 |
| 2006/0207448 | A1 | 9/2006 | Fresener | |
| 2013/0330486 | A1 | 12/2013 | Shields | |
| 2015/0152274 | A1 | 6/2015 | Pearl et al. | |
| 2019/0061409 | A1 | 2/2019 | Whiterman | |

FOREIGN PATENT DOCUMENTS

WO 2001029517 A1 4/2001

OTHER PUBLICATIONS

Wikipedia, CMYK Color Model, Retrieved from the Internet: https://en.wikipedia.org/wiki/CMYK_color_model [retrieved on Jul. 22, 2019], 5 pages.

Wikipedia, Spot Color, Retrieved from the Internet: https://en.wikipedia.org/wiki/Spot_color [retrieved on Jul. 22, 2019], 2 pages.

Taublieb, Charlie, Simluated Process on Light and Dark Garments, Retrieved from the Internet: https://iss.a2zinc.net/FortWorth2018/Custom/Handout/Speaker14066_Session4811_1.pdf [retrieved on Jul. 22, 2019], 15 pages.

(Continued)

*Primary Examiner* — Leslie J Evanisko

(74) *Attorney, Agent, or Firm* — IPTechLaw

(57) ABSTRACT

Implementations of methods of screen printing an image may include printing a subtractive primary colored semi-opaque ink onto a substrate and printing a subtractive primary colored semi-transparent ink over the semi-opaque ink. The method may be capable of achieving an entire cyan, magenta, yellow, key (CMYK) gamut of colors.

20 Claims, 15 Drawing Sheets

(56) References Cited

OTHER PUBLICATIONS

Ingram, Kaitlyn, CMYK vs. Spot Color vs. Simulated Process Printing, https://www.screenprinting.com/blogs/news/cmyk-vs-spot-vs-simulated-process-whats, May 17, 2017, 5 pages.
International Search Report, PCT Patent Application No. PCT/US2020/045236, Jan. 4, 2021, 4 pages.

* cited by examiner

SCREEN PRINTING METHOD

CROSS REFERENCE TO RELATED APPLICATIONS

This application is a continuation-in-part application of the earlier U.S. Utility Patent Application to Gibson entitled "Screen Printing Method," application Ser. No. 16/536,674, filed Aug. 9, 2019, now issued as U.S. Pat. No. 11,241,874, the disclosure of which is hereby incorporated entirely herein by reference.

BACKGROUND

1. Technical Field

Aspects of this document relate generally to screen printing methods.

2. Background

Screen printing is a printing technique where ink is transferred to a substrate. A stencil enables the ink to print only in select areas through a mesh material. The ink may be printed on a substrate such as a canvas or garment.

SUMMARY

Implementations of methods of screen printing an image may include printing a subtractive primary colored semi-opaque ink onto a substrate, printing a first subtractive primary colored semi-transparent ink over the semi-opaque ink, and printing a second subtractive primary colored semi-transparent ink over the semi-opaque ink. The method may be capable of achieving three out of six primary and secondary colors.

Implementations of methods of screen printing an image may include one, all, or any of the following:

Six or fewer screens may be used in printing the image.

The substrate printed upon may be either colored or black.

The method may include printing a second subtractive primary colored semi-opaque ink and a third subtractive primary colored semi-opaque ink onto the substrate.

The method may include spot printing a second semi-opaque ink.

The method may include printing a white under-base onto the substrate.

The method may include curing the subtractive primary colored semi-opaque ink.

Implementations of methods of screen printing an image may include printing a semi-opaque base onto a substrate, the semi-opaque base including any two of a semi-opaque yellow ink, semi-opaque magenta ink, or semi-opaque cyan ink. The method may also include printing at least one of a process cyan ink, a process magenta ink, or a process yellow ink onto the semi-opaque base. The method of screen printing may be capable of achieving four out of six primary and secondary colors.

Implementations of methods of screen printing an image may include one, all, or any of the following:

No more than two process inks may be used in the method.

Eight or fewer screens may be used in printing the image.

The method may include printing a white under-base onto the substrate. The substrate may be either colored or black.

The method may include curing the semi-opaque base.

Implementations of methods of screen printing an image may include printing a semi-opaque base onto a substrate. The semi-opaque base may include a semi-opaque yellow ink. The method may also include printing at least one of a process cyan ink and a process magenta ink onto the semi-opaque base. The method of screen printing may be capable of achieving a yellow color, a green color, and an orange color.

Implementations of methods of screen printing an image may include one, all, or any of the following:

The semi-opaque base may further include a semi-opaque cyan ink.

The semi-opaque base may further include a semi-opaque magenta ink.

The semi-opaque base may further include a semi-opaque cyan ink and a semi-opaque magenta ink.

The process cyan ink and the process magenta ink may only overlie the semi-opaque yellow ink.

The method may further include spot printing a semi-opaque violet ink.

The method may include curing the base.

The method may be capable of achieving an entire CMYK gamut of colors.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

This disclosure, its aspects and implementations, are not limited to the specific components, assembly procedures or method elements disclosed herein. Many additional components, assembly procedures and/or method elements known in the art consistent with the intended screen printing and image generating methods will become apparent for use with particular implementations from this disclosure. Accordingly, for example, although particular implementations are disclosed, such implementations and implementing components may comprise any shape, size, style, type, model, version, measurement, concentration, material, quantity, method element, step, and/or the like as is known in the art for such screen printing and image generating methods, and implementing components and methods, consistent with the intended operation and methods.

As used herein, when the implementations disclosed refer to primary colors, it is understood that they refer to the subtractive primary colors, namely yellow, magenta, and cyan. Likewise, when secondary colors are referred to herein, it is understood that the secondary colors are subtractive secondary colors and refer to the colors generated through intersecting subtractive primary colors.

Figure 1:
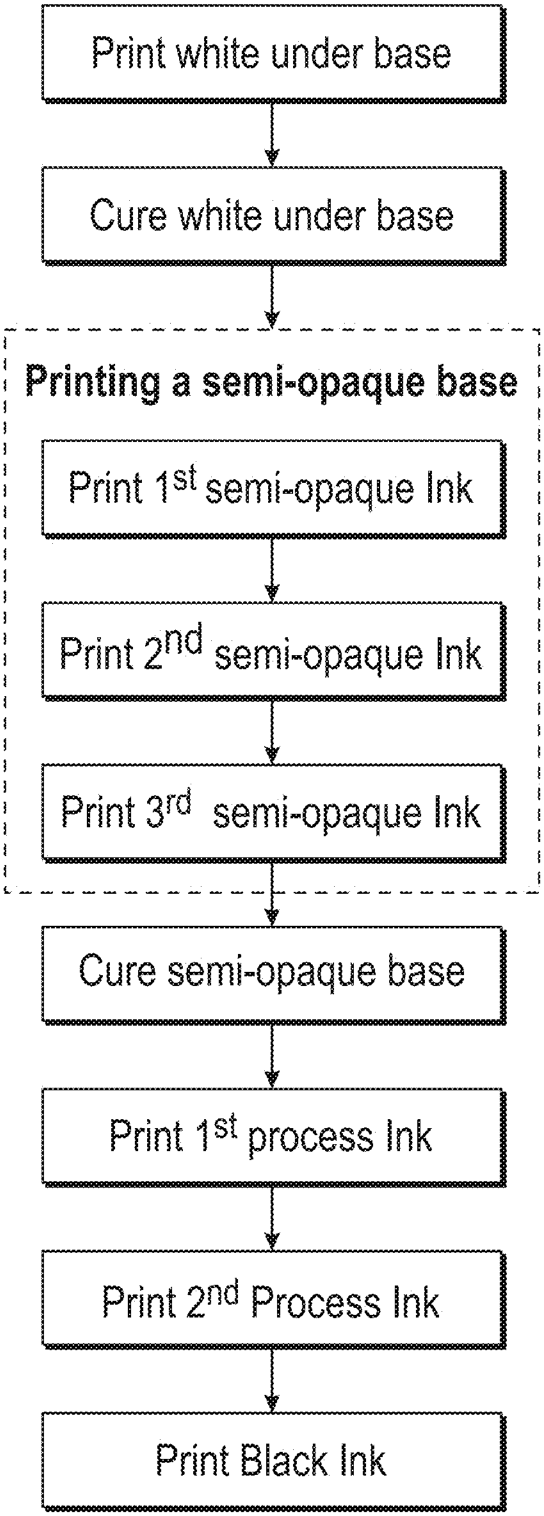
FIG. 1 is a process flow illustrating a method of screen printing.

Referring to FIG. 1, a process flow of a method of screen printing is illustrated. In various implementations, screen printers and elements thereof known by those of skill in the art may be implemented to perform any of the methods disclosed herein. The implementations disclosed herein may utilize only plastisol ink. In other implementations, the methods disclosed herein may utilize offset printing with ultra-violet (UV) ink. In various implementations, the method includes providing a substrate. The substrate may include a garment, and in particular implementations, the garment may be a shirt. In other implementations, the substrate may include a canvas, paper, fabric, or any other surface capable of being screen printed on. In various implementations, the substrate may be colored or black. In other implementations, the substrate may be white. As used herein, the underlying material to be printed on, and not the under-base inks, is referred to as the substrate.

Still referring to FIG. 1, in implementations of methods of screen printing on a colored or black substrate, the method may include printing a white under-base onto the substrate in the location where the image is to be printed. In such implementations, the white under-base may include a white ink. In various implementations, the white under-base may be cured after it is printed onto the substrate using any method of curing disclosed herein. In other implementations, especially implementations including a white or light colored substrate, the method may not include printing the white under-base onto the substrate. In still other implementations, the method of screen printing may include printing a white highlight layer, or a white bump layer, over the entire white under-base or portions thereof. In implementations where it covers the entire white under-base, the white highlight layer may serve as a second white under-base layer to further accentuate the true colors of the overlying inks. The white under-base may or may not be cured prior to printing the white highlight layer. The method may include curing the white highlight layer after it is printed using any method of curing disclosed herein. In implementations where the white highlight layer does is not intended to have any overlying ink, the method does not require that the white highlight layer be cured before printing the semi-opaque base over the white under-base. Accordingly, in various implementations both the white under-base and white highlight layer are cured which may result in a truer image. As used herein, truer is used to describe the accuracy of the intended colors of the CMYK gamut. In various implementations, the white highlight layer may be printed in select portions corresponding to white areas of the final image. In other implementations, the white highlight layer may be printed over select areas of the white under-base, the select areas corresponding to colors of the final image which are intended to show a brighter color. The white under-base and/or the white highlight layer may include a solidity between 40%-80%. In other implementations, the solidity may be more than 80% or less than 40%.

Figure 10:
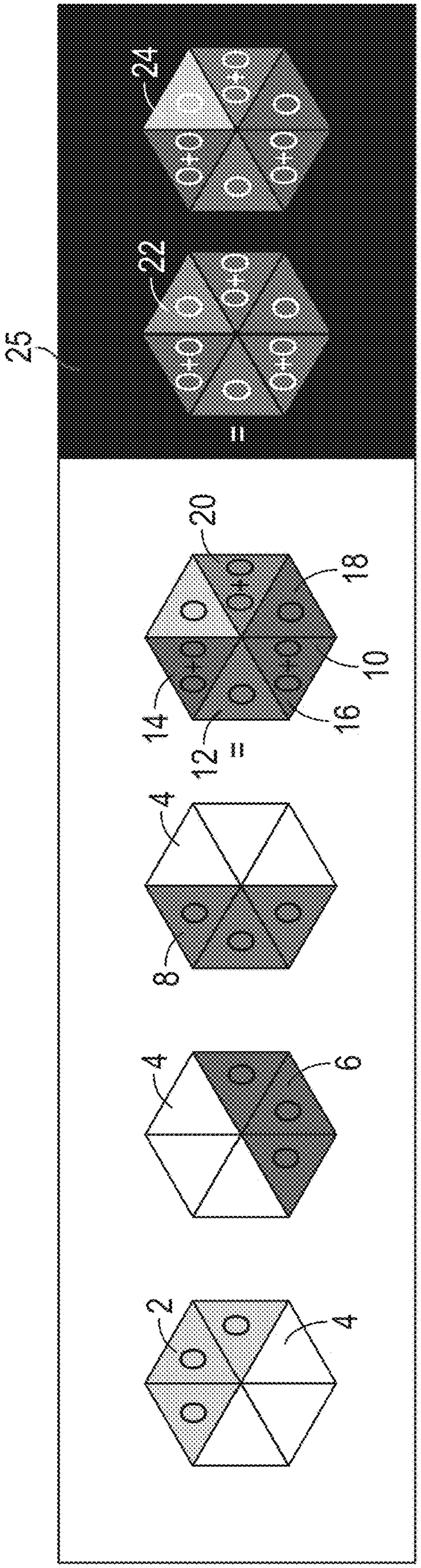
FIG. 10 is an illustration of an implementation of a method of screen printing an image using overlapping semi-opaque inks.

Still referring to FIG. 1, the method of screen printing includes printing a semi-opaque base over the substrate. In particular implementations, the semi-opaque base may cover the entire surface area of the image to be printed except for areas of the final image intended to be white, black, or having a non-primary color semi-opaque ink printed. Because it is understood that no ink is perfectly opaque (or prevents all light from passing through), as used herein, semi-opaque inks are defined as inks that have an opacity or solidity sufficient to prevent secondary colors from being created when different primary inks are printed on top of one another. In various implementations, the semi-opaque base and/or inks include a solidity of 30% or more. In other implementations, the semi-opaque base and/or inks include a solidity of between 25% and 40%. In still other implementations, the semi-opaque inks may have a solidity of less than 25%, and may then have pigments added to the inks to increase the solidity. An example of semi-opacity is illustrated by FIG. 10. Referring to FIG. 10 (and FIG. 20), an implementation of a method of screen printing an image using overlapping semi-opaque inks is illustrated. As illustrated, the method depicted by FIG. 10 includes printing a semi-opaque yellow ink 2 on a substrate 4. As utilized in the drawings, “O” is used to identify a semi-opaque ink. The method also includes printing a semi-opaque magenta ink 6 over the substrate 4, and printing a semi-opaque cyan ink 8 over the substrate 4. While FIG. 10 illustrates the magenta ink 6 and the cyan ink 8 printed onto a blank or white substrate 4, the method actually includes printing the magenta ink 6 over the substrate 4 and portions of the yellow ink 2 and printing the cyan ink 8 over the substrate 4 and portions of the yellow ink 2 and the magenta ink 6. When the inks are printed over one another, an image 10 is generated. The image 10 is illustrated on a white substrate. As illustrated by FIG. 10, the image 10 includes a cyan section 12 directly printed over the substrate 4. The image also includes an area 14 of cyan printed over yellow and an area 16 of cyan printed over magenta. Because the cyan ink 8 is a semi-opaque ink, the areas 14 and 16 are predominantly cyan in color, though the shades of cyan may differ slightly from the pure cyan illustrated by portion 12. Similarly, the image 10 includes a magenta section 18 printed directly over the substrate 4. The image also includes an area 20 of magenta printed over yellow. Because the magenta ink 6 is a semi-opaque ink, the area 20 is predominantly magenta in color, though the shade of magenta may differ slightly from the pure magenta illustrated in section 18. Image 22 is the same as image 10 except for the fact that image 22 is printed directly over a black substrate 25. Similarly, image 24 is the same as image 22, except for the fact that image 24 is printed over a white under-base printed on the black substrate 25. Accordingly, as illustrated by FIG. 10, the semi-opaque yellow ink 2, the semi-opaque magenta ink 6, and the semi-opaque cyan ink 8 are not perfectly opaque, or have 100% solidity, as the shades of the colors may differ depending on the color of the underlying substrate or ink. With this said, they are sufficiently opaque inasmuch as they do not create secondary colors when overlaid with the primary semi-opaque inks.

Figure 2:
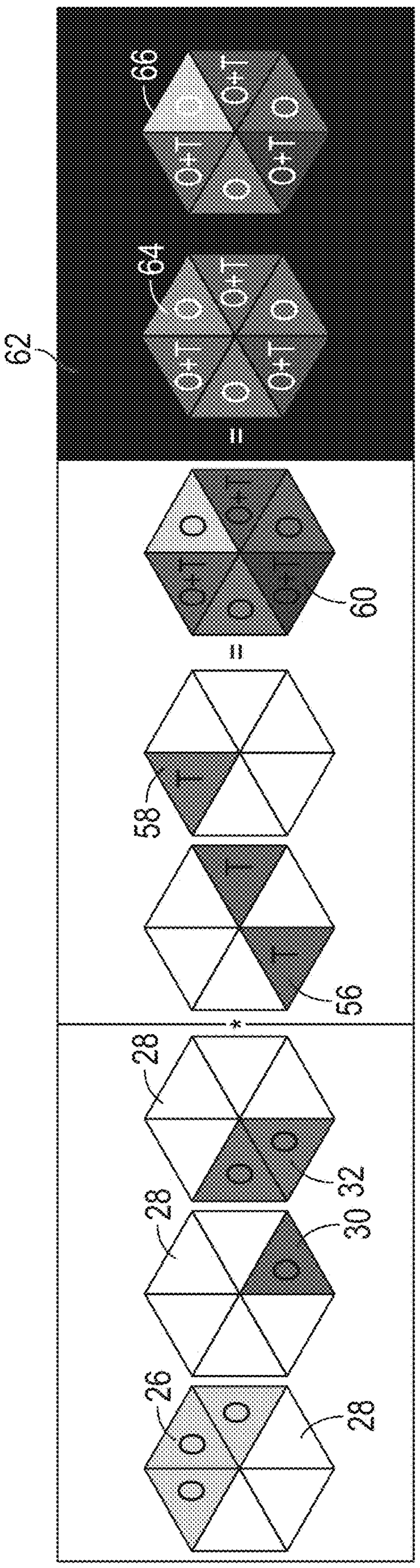
FIG. 2 is an illustration of a first implementation of a method of screen printing an image.

In various implementations, the semi-opaque base includes one, two, or three different semi-opaque inks, all of which are a primary color. As used herein, the semi-opaque base constitutes the base of semi-opaque primary colors. Accordingly, other non-primary colored semi-opaque inks printed on the image are not considered part of the semi-opaque base. Referring back to FIG. 1, the method of screen printing an image and generating the semi-opaque base includes printing a first semi-opaque ink. The first semi-opaque ink may be a yellow ink, a magenta ink, or a cyan ink. Referring to FIG. 2 (and FIG. 12), an illustration of a first implementation of a method of screen printing an image is illustrated. As illustrated by FIG. 2, the first semi-opaque ink 26 is a yellow ink printed over a white substrate 28. Referring back to FIG. 1, the method of screen printing an image and generating the semi-opaque base may also include printing a second semi-opaque ink and a third semi-opaque ink over the substrate. The second and third semi-opaque inks may be a yellow ink, a magenta ink, or a cyan ink. Referring back to FIG. 2, in particular implementations the second semi-opaque ink 30 may be a magenta ink printed over the substrate 28, and the third semi-opaque ink 32 may be a cyan ink printed over the substrate 28. In such implementations, the semi-opaque base may include a semi-opaque yellow ink, a semi-opaque magenta ink, and a semi-opaque cyan ink. As illustrated by FIG. 2, none of the first, second, and third semi-opaque inks forming the semi-opaque base overlap with one another but collectively fill the entire colored area of the image. In implementations where the final image has visible white (unlike FIG. 2), the semi-opaque base does not fill the areas of the final image which are visibly white. In other implementations, the semi-opaque base also does not fill the areas of the final image which are visibly black. In other implementations having secondary semi-opaque spot colors printed in select portions of the image, the semi-opaque base may or may not fill the area of the image where the semi-opaque secondary colors are to be spot printed. In other implementations, the semi-opaque inks may slightly overlap at the edges due to ink gain, however, in such implementations the semi-opaque inks do not substantially overlap one another. While FIG. 2 illustrates the inks of the base as individually printed over the substrate 28, it is understood that the inks of the semi-opaque base may be printed together in order to fill the area of the image. Further, while FIG. 2 illustrates the first, second, and third semi-opaque inks as collectively filling the entire image, in other implementations only a portion of the image may be filled with the semi-opaque inks. The first, second, and third semi-opaque inks may all be printed wet and then cured after the semi-opaque base has been entirely printed.

Referring back to FIG. 1, the method of screen printing an image may include curing the semi-opaque base. In various implementations, curing may include flash curing or any other type of curing. Flash curing may be performed with infrared panels or quartz tubes. In various implementations, curing may only include partially curing the semi-opaque base. In such implementations, the semi-opaque base may be dried enough to print ink on top of the semi-opaque base but not entirely dried through. In implementations having a partially cured semi-opaque base, the partially cured semi-opaque base may facilitate adhesion of ink onto the semi-opaque base. In other implementations, the ink may completely dry during the flash cure.

Figure 11:
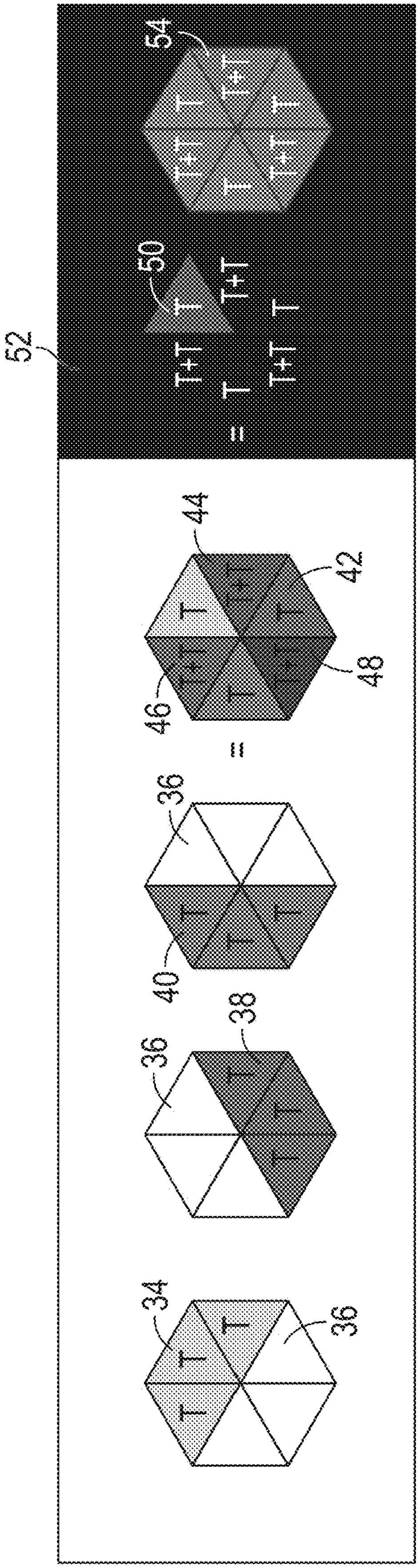
FIG. 11 is an illustration of an implementation of a method of screen printing an image using overlapping semi-transparent inks.

Still referring to FIG. 1, the method of screen printing an image includes printing a semi-transparent ink, also referred to as a process ink, over the semi-opaque base (or primary colored semi-opaque inks). As used herein, semi-transparent means allowing a sufficient amount of light to pass through, thus allowing the creation of intended secondary colors when a semi-transparent primary colored ink is overlaid with an ink of a different primary color. In various implementations, the semi-transparent or process inks disclosed herein includes a solidity of less than 5%. In particular implementations, the solidity of the semi-transparent inks disclosed herein may be 2%-3%. An example of the degree of transparency of the various process inks disclosed herein is illustrated by FIG. 11 (and FIG. 21), which is an illustration of an implementation of a method of screen printing an image using overlapping semi-transparent inks. The "T" illustrated in the drawings refers to semi-transparent inks. As illustrated by FIG. 11, three semi-transparent inks, a yellow ink 34, a magenta ink 38, and a cyan ink 40 are illustrated as all printed onto a white substrate 36. The three semi-transparent inks overlap one another and form an image 42. Because the inks are semi-transparent and because they overlap one another, the image 42 includes an orange/red (hereinafter "red") section 44 resulting from the magenta ink 38 overlapping the yellow ink 34, a green section 46 resulting from the cyan ink 40 overlapping the yellow ink 34, and a violet section 48 resulting from the cyan ink 40 overlapping the magenta ink 38. Because the inks are semi-transparent, when overlaid they are able to create intended secondary colors. Further, because the inks are semi-transparent, when they are printed onto a black substrate 52, such as is image 50, the image is difficult to see as the black substrate is seen through and obscures/darkens the image 50. Even when an image is printed on a white under-base over the black substrate 52, as is image 54, the image is still false as the color from the substrate is seen through the image 54.

Referring back to FIG. 2, in various implementations the first semi-transparent ink may be a semi-transparent yellow, magenta, or cyan ink. As illustrated by FIG. 2, the first semi-transparent ink is a semi-transparent magenta ink 56. The first semi-transparent ink may be configured to overlay two of the three colors of the semi-opaque base which are not the same color as the semi-transparent ink. As illustrated by FIG. 2, the magenta semi-transparent ink 56 is configured to print over a portion of the semi-opaque yellow ink 26 and a portion of the semi-opaque cyan ink 32. Referring back to FIG. 1, the method of screen printing an image includes printing a second semi-transparent ink (or process ink) over the semi-opaque base. The second semi-transparent ink may be a semi-transparent yellow ink, a semi-transparent magenta ink, or a semi-transparent cyan ink. As illustrated by FIG. 2, the second semi-transparent ink may be a semi-transparent cyan ink 58. In various implementations, the semi-transparent cyan ink 58 may overlap a single semi-opaque ink of the semi-opaque base. As illustrated, the entirety of the semi-transparent, or process, inks printed may be printed over the semi-opaque base. While the implementation illustrated by FIG. 2 illustrates the semi-transparent magenta ink as the first process ink and the semi-transparent cyan ink as the second process ink, in various implementations the method may include printing the semi-transparent cyan ink (or second semi-transparent ink) before printing the semi-transparent magenta ink (or first semi-transparent ink).

As illustrated by FIG. 2, the method of screen printing is able to print image 60. By combining the three semi-opaque inks of the semi-opaque base with the two semi-transparent inks, image 60 is comparable to an image printed using the four color process (or cyan, magenta, yellow and black or key (CMYK process)) of straight semi-transparent inks on a white substrate as illustrated by FIG. 11. The method illustrated by FIGS. 1-2 is capable of achieving an entire CMYK gamut of colors on a black substrate using only primary colored ink, a white under-base ink, and a black ink. As used herein, the "entire CMYK gamut of colors" refers to the resulting six colors of cyan, yellow, magenta, green, violet, and orange from printing three semi-opaque primary colored inks and printing two semi-transparent inks over at least two of the semi-opaque inks, as is illustrated by at least FIGS. 2-7. As illustrated by FIG. 2, image 60 is printed on a white substrate 28 and results in an image similar to image 42 of FIG. 11 which is printed using a CMYK process. However, as illustrated by FIG. 2, when the method of printing is performed on a colored or a black substrate, such as substrate 62, the image 64 is produced. Image 64, while slightly obscured due to the color of the substrate and the semi-opacity of the semi-opaque base, still includes a clear distinction of the various colors of the image. Further, in various implementations, and as illustrated by FIG. 1, the method may include printing a white under-base (and possibly a white highlight layer) prior to printing the semi-opaque base over the substrate. In such implementations, the image printed may be similar to image 66 having a true appearance of colors similar to the implementation of printing the image on a white substrate. Images 64 and 66 stand in clear contrast to image 50 and 54 of FIG. 11. As illustrated by FIG. 11, when a CMYK process is printed on a black substrate, the black substrate is seen strongly enough through the image that the image is nearly invisible. Even when a white under-base is printed over the black substrate, such as is the case in image 54, the colors of the image are muted. More specifically, because the transparent inks react with components of the white ink of the under-base, the colors generated are muted and false as the white under-base prevents the transparent inks from generating the true colors. Further, depending on the degree of opacity of the white under-base, the black substrate still is seen strongly enough through the image that the image can be rendered void or false. By first printing the semi-opaque base followed by the semi-transparent inks, as illustrated by FIGS. 1-2, an image having the entire CMYK gamut of colors may be printed on a colored or black substrate. In such implementations, the method allows for the results of CMYK process screen printing on a white substrate to be obtained on a colored or a black substrate. Specifically, the full CMYK gamut of colors may be obtained from the five inks disclosed in FIG. 2 and from a black or a key ink. Such implementations may be capable of printing images comparable to images printed with a CMYK model using only primary colored semi-transparent inks on a white substrate.

Referring back to FIG. 1, in various implementations, the method may also include printing a black, or key, ink in select areas after printing the second semi-transparent ink. In such implementations, the black ink may be printed in order to obtain a clear black area in select areas of the print. In implementations having a white or a light substrate, the method may also include printing a black accent layer after printing the black ink. The black accent layer may ensure that select areas of the image are entirely black and the substrate is not seen through the first layer of black ink.

Figure 8:
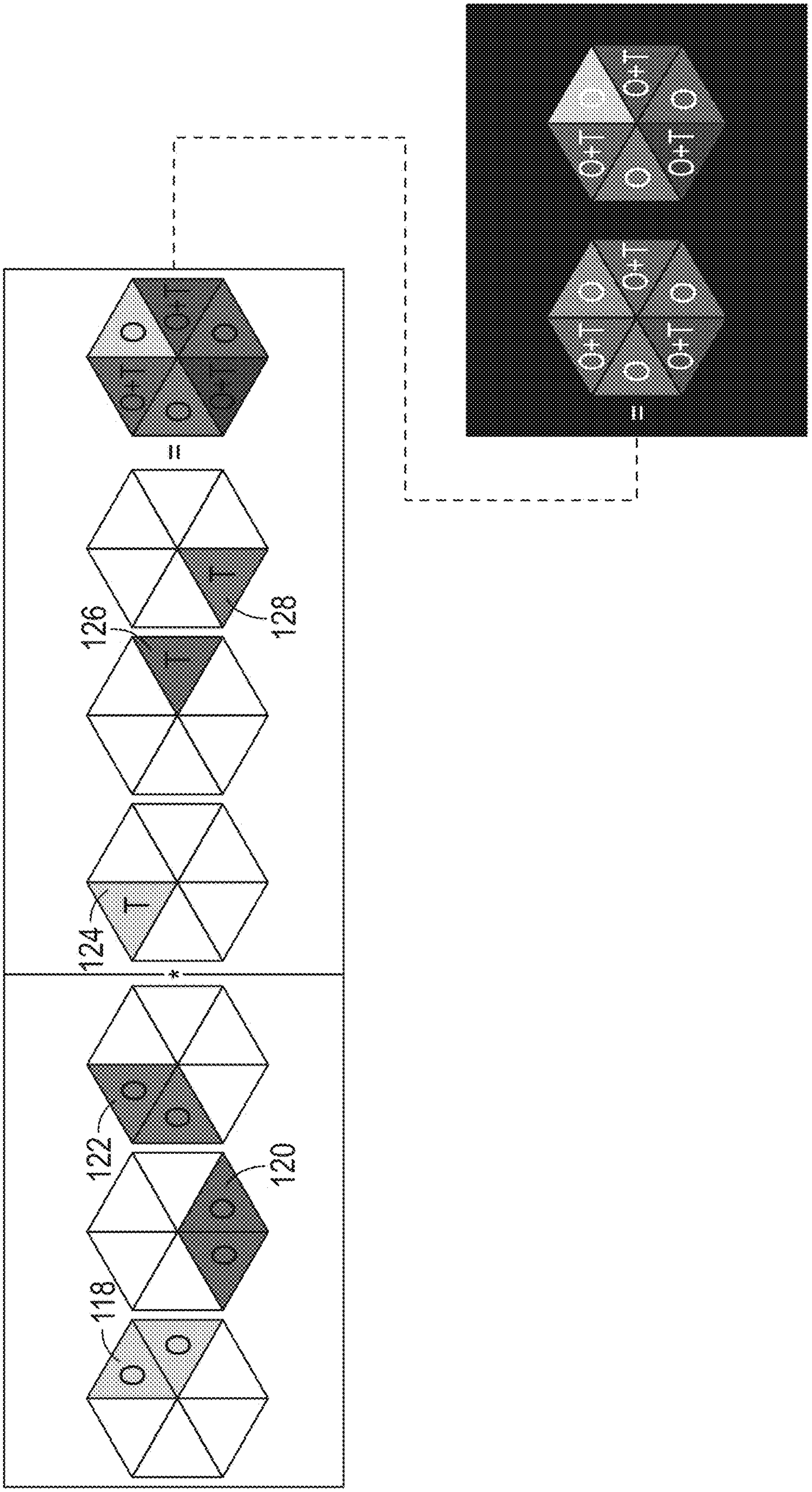
FIG. 8 is an illustration of a seventh implementation of a method of screen printing an image.

In various implementations, the screen printing system used to implement the methods disclosed herein may utilize only five screens to print the image. In such implementations, each of the five screens may respectively correspond with one of the five inks depicted in FIG. 2. In implementations where the black or key ink is printed after printing the semi-transparent inks, a sixth screen may be required by the system implementing the method of printing. Further, in particular implementations, a second black ink may also be printed and may require an additional screen. In such implementations, the second black may be printed over the first black and can cover portions of the substrate showing through the first black ink printed. Further, in implementations of printing upon a black or colored substrate, an additional screen may be used in the system in order to print the white under-base, and in implementations of methods printing a white highlight layer, an additional screen may be used. Accordingly, various implementations of the screen printing method may include eight or fewer screens. In still other implementations, more screens than eight may be included in the screen printing system. In particular implementations printing three semi-opaque inks and three semi-transparent inks, such as is illustrated by FIG. 8, the method may include using nine screens as either two white screens and a black screen may also be used, or if printed on a white or light substrate, two black screens and a single white screen could be used. Likewise, other implementations may have fewer than six screens in implementations not needing to produce the full CMYK gamut of color. By reducing the number of screens used (as compared to a spot process of printing a plurality of colors), the cost and space required for the overall process may be reduced. Furthermore, in various implementations, additional semi-opaque (which may be non-primary colors) inks may be added outside of, or around the areas of the semi-opaque base and/or the semi-transparent inks.

Figure 3:
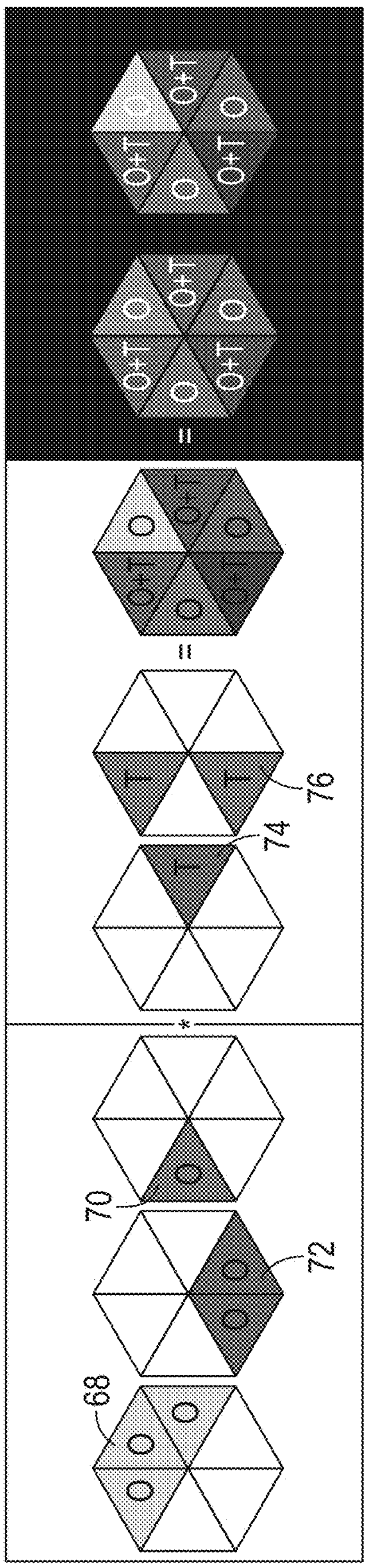
FIG. 3 is an illustration of a second implementation of a method of screen printing an image.

While the implementations illustrated herein depict an image of a color wheel representing the CMYK gamut, it is understood that this image is a representation of any image that could be printed having the full CMYK gamut. Further, as illustrated by FIG. 2, because the entirety of yellow is utilized in the semi-opaque base, there is no need to include a semi-transparent yellow ink over the semi-opaque base. In various implementations, the color of the semi-opaque ink not having a corresponding semi-transparent ink may be the primary color most abundant in the image. Various implementations of methods of screen printing may utilize different relative ratios of semi-opaque yellow ink, semi-opaque magenta ink, and semi-opaque cyan ink, and in turn, alter the ratio, position, and type of semi-transparent ink printed. Specific examples of various implementations of methods comparable to the method illustrated by FIG. 2 are illustrated by FIGS. 3-7. Referring to FIG. 3 (and FIG. 13), a second implementation of a method of screen printing an image is illustrated. The method may include printing the semi-opaque base. Regarding quantities of the respective inks, as illustrated, a semi-opaque yellow ink 68 may be the major ink of the semi-opaque base, a semi-opaque cyan ink 70 may be the minor ink of the semi-opaque base, and the semi-opaque magenta ink 72 may be the intermediate ink of the semi-opaque base. Such an implementation may include semi-transparent magenta ink 74 as the minor semi-transparent ink and semi-transparent cyan ink 76 as the major semi-transparent ink of the image. As illustrated, the resulting image printed by FIG. 3 may be the same as the resulting image printed by FIG. 2.

Figure 4:
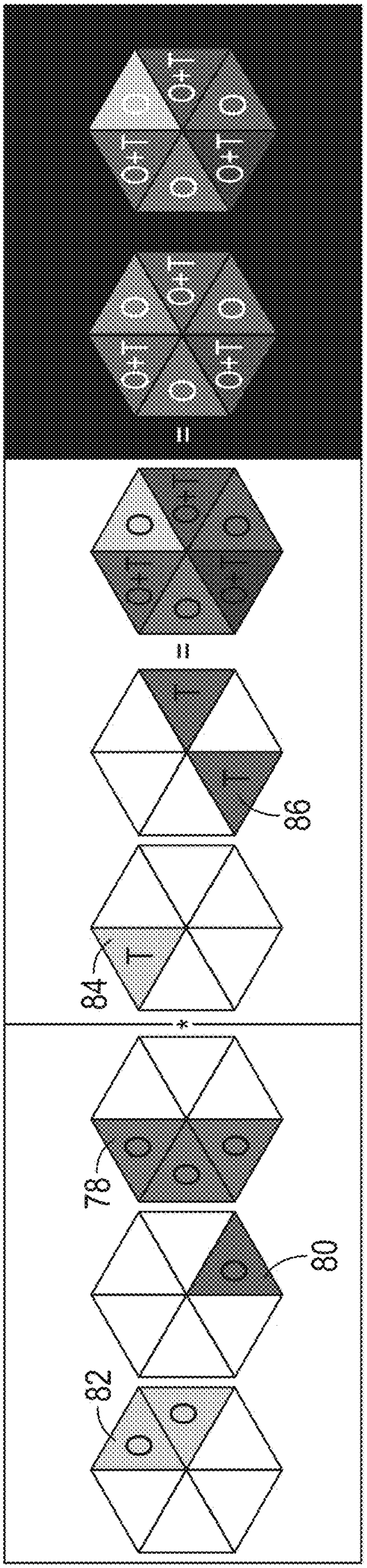
FIG. 4 is an illustration of a third implementation of a method of screen printing an image.

Referring to FIG. 4 (and FIG. 14), a third implementation of a method of screen printing an image is illustrated. The method may include printing the semi-opaque base. Regarding quantities of the respective inks, as illustrated, a semi-opaque cyan ink 78 may be the major ink of the semi-opaque base, a semi-opaque magenta ink 80 may be the minor ink of the semi-opaque base, and the semi-opaque yellow ink 82 may be the intermediate ink of the semi-opaque base. Such an implementation may include semi-transparent yellow ink 84 as the minor semi-transparent ink and semi-transparent magenta ink 86 as the major semi-transparent ink of the image. As illustrated, the resulting image printed by FIG. 4 may be the same as the resulting image printed by FIG. 2.

Figure 5:
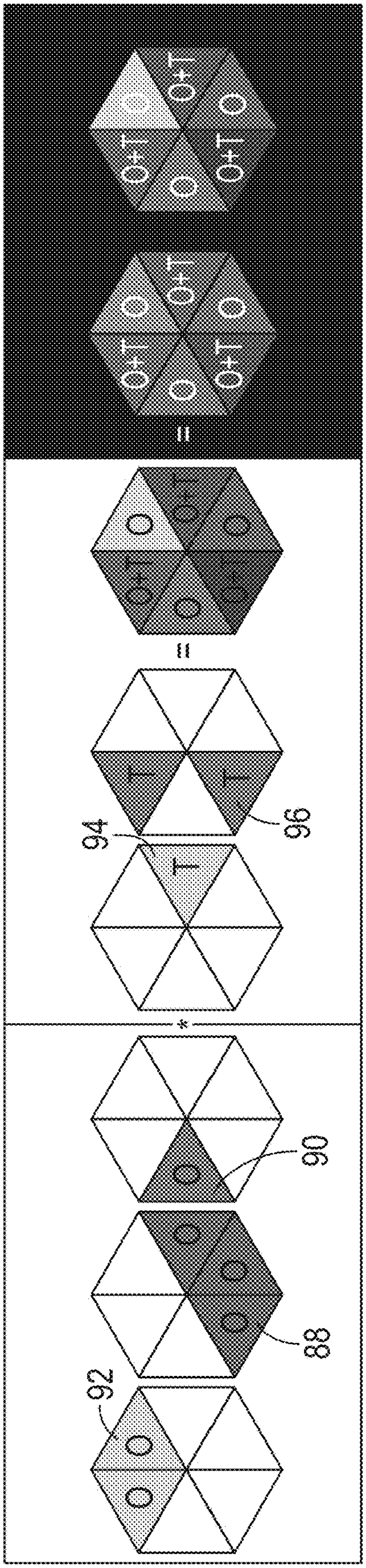
FIG. 5 is an illustration of a fourth implementation of a method of screen printing an image.

Referring to FIG. 5 (and FIG. 15), a fourth implementation of a method of screen printing an image is illustrated. The method may include printing the semi-opaque base. Regarding quantities of the respective inks, as illustrated, a semi-opaque magenta ink 88 may be the major ink of the semi-opaque base, a semi-opaque cyan ink 90 may be the minor ink of the semi-opaque base, and the semi-opaque yellow ink 92 may be the intermediate ink of the semi-opaque base. Such an implementation may include semi-transparent yellow ink 94 as the minor semi-transparent ink and semi-transparent cyan ink 96 as the major semi-transparent ink of the image. As illustrated, the resulting image printed by FIG. 5 may be the same as the resulting image printed by FIG. 2.

Figure 6:
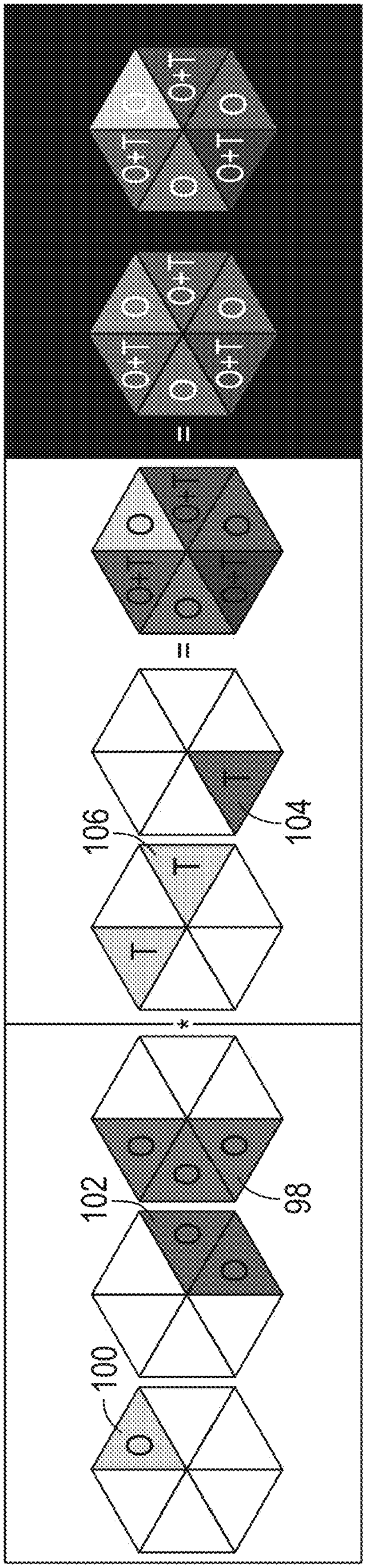
FIG. 6 is an illustration of a fifth implementation of a method of screen printing an image.

Referring to FIG. 6 (and FIG. 16), a fifth implementation of a method of screen printing an image is illustrated. The method may include printing the semi-opaque base. Regarding quantities of the respective inks, as illustrated, a semi-opaque cyan ink 98 may be the major ink of the semi-opaque base, a semi-opaque yellow ink 100 may be the minor ink of the semi-opaque base, and the semi-opaque magenta ink 102 may be the intermediate ink of the semi-opaque base. Such an implementation may include semi-transparent magenta ink 104 as the minor semi-transparent ink and semi-transparent yellow ink 106 as the major semi-transparent ink of the image. As illustrated, the resulting image printed by FIG. 6 may be the same as the resulting image printed by FIG. 2.

Figure 7:
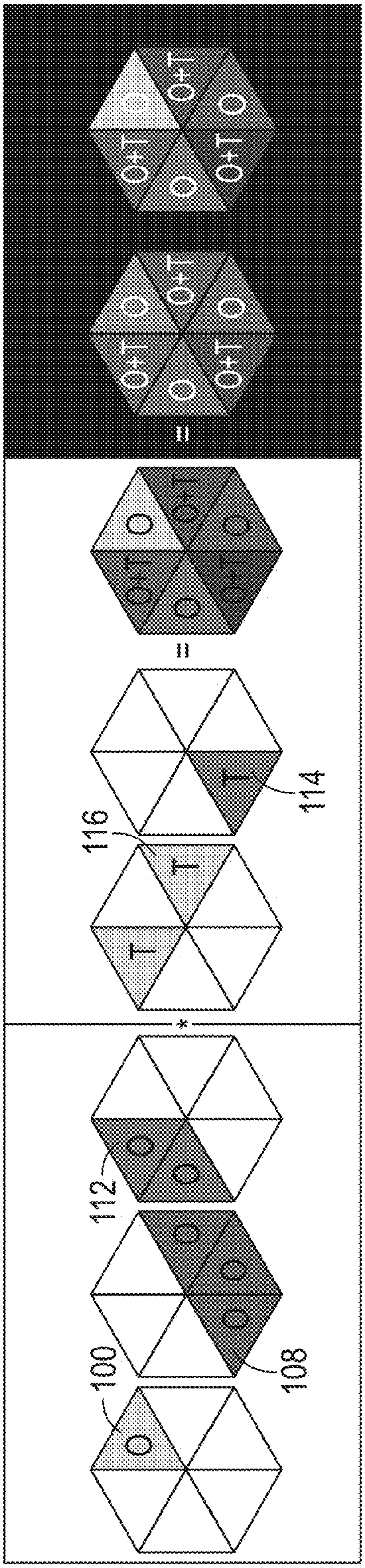
FIG. 7 is an illustration of a sixth implementation of a method of screen printing an image.

Referring to FIG. 7 (and FIG. 17), a sixth implementation of a method of screen printing an image is illustrated. The method may include printing the semi-opaque base. Regarding quantities of the respective inks, as illustrated, a semi-opaque magenta ink 108 may be the major ink of the semi-opaque base, a semi-opaque yellow ink 110 may be the minor ink of the semi-opaque base, and the semi-opaque cyan ink 112 may be the intermediate ink of the semi-opaque base. Such an implementation may include semi-transparent cyan ink 114 as the minor semi-transparent ink and semi-transparent yellow ink 116 as the major semi-transparent ink of the image. As illustrated, the resulting image printed by FIG. 7 may be the same as the resulting image printed by FIG. 2.

Thus, as illustrated by FIGS. 2-7, the full CMYK gamut of colors can be achieved through the use of the three primary colored semi-opaque inks and no more than two primary colored semi-transparent inks.

Referring to FIG. 8 (and FIG. 18), a seventh implementation of a method of screen printing an image is illustrated. As illustrated by FIG. 8, in various implementations the semi-opaque base may include semi-opaque yellow ink 118, semi-opaque magenta ink 120, and semi-opaque cyan ink 122. The method may also include printing semi-transparent yellow ink 124, magenta ink 126, and cyan ink 128 over the semi-opaque base to allow each semi-transparent ink to intersect with all of the primary colors of the semi-opaque base and to generate an image having both primary and secondary colors. The method illustrated by FIGS. 2-7 are different than this as the method depicted by FIGS. 2-7 only generates secondary colors through the overlap of the process inks with only the major and intermediate primary colored semi-opaque inks. The image of FIG. 8 may appear the same as the image printed by the method of FIG. 2. Similar to FIG. 8, FIG. 9 (and FIG. 19) illustrates an eighth implementation of a method of screen printing an image. While FIG. 9 results in the same image as depicted by FIG. 8, the difference is the relative position of the semi-opaque inks and the semi-transparent inks. Accordingly, various implementations of methods of screen printing disclosed herein may result in the same or substantially same image though using different inks in different positions.

While the implementations disclosed herein refer to first/second/third inks, it is understood that the semi-opaque inks may print in any sequence inasmuch as the primary colored semi-opaque inks do not overlap. Further, it is understood that the process inks (or semi-transparent inks) may print in any sequence after the semi-opaque inks because their transparent qualities yield virtually the same result.

While the implementations illustrated by FIGS. 2-9 illustrate the generation of the entire CMYK gamut of colors, in various implementations not every primary color will be used in the semi-opaque base. In such implementations, if any one primary semi-opaque ink is printed with two corresponding primary semi-transparent inks, 50% of the entire CMYK gamut will be generated. Likewise, if any two primary semi-opaque inks are printed with the corresponding two semi-transparent inks, five of the six primary and secondary colors, or 86.3% of the entire CMYK gamut can be generated.

Figure 22:
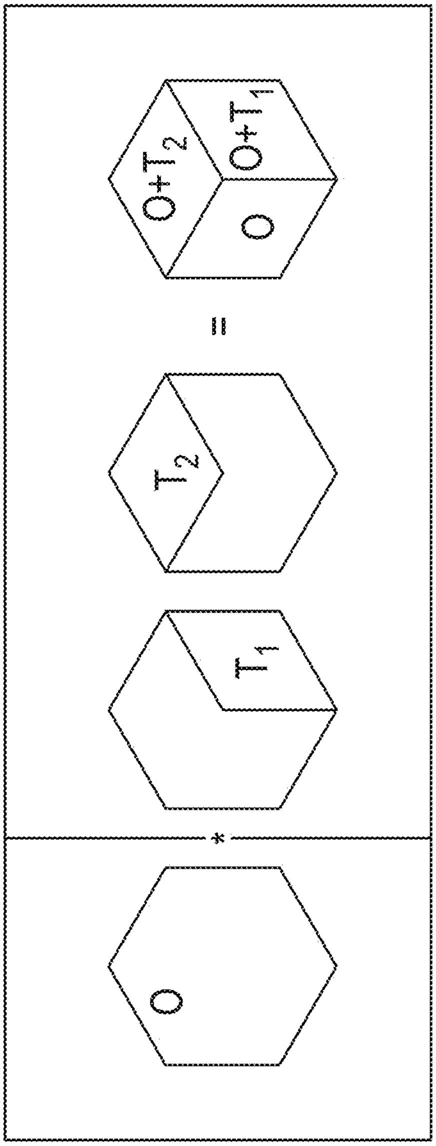
FIG. 22 is an illustration of a ninth implementation of a method of screen printing an image.

Referring to FIG. 22, a ninth implement of a method of screen printing an image is illustrated. The method illustrated by FIG. 9 may be similar to the other methods disclosed in FIGS. 1-7 with the difference being that the primary colored semi-opaque base 142 may include only a single subtractive primary colored semi-opaque ink. The subtractive primary colored semi-opaque ink may be a semi-opaque yellow, cyan, or magenta ink. Similar to the methods illustrated by FIGS. 1-7, the method may include printing a first subtractive primary colored semi-transparent ink 144 (illustrated as T1 in FIG. 22) over the semi-opaque base. In various implementations, the method may include printing only one semi-transparent ink over the base. In other implementations, and as illustrated by FIG. 22, the method may include printing a second subtractive primary colored semi-transparent ink 146 over the semi-opaque base. The first and second primary colored semi-transparent inks may include the two primary colors different than the subtractive primary colored semi-opaque ink used in the semi-opaque base. In various implementations the method illustrated by FIG. 22 may be capable of achieving three out of six primary and secondary colors, or substantially 50% of the entire CMYK gamut. The three resulting colors of FIG. 22 is illustrated by O, O+T1, and O+T2. In implementations where only a single semi-transparent ink is printed over the semi-opaque base, the method may be capable of achieving two out of six primary and secondary colors, or substantially 33% of the entire CMYK gamut. In such implementations the resulting colors would be O and O+T1.

In various implementations, the final image illustrated by FIG. 22 may be printed using six or fewer screens.

Figure 23:
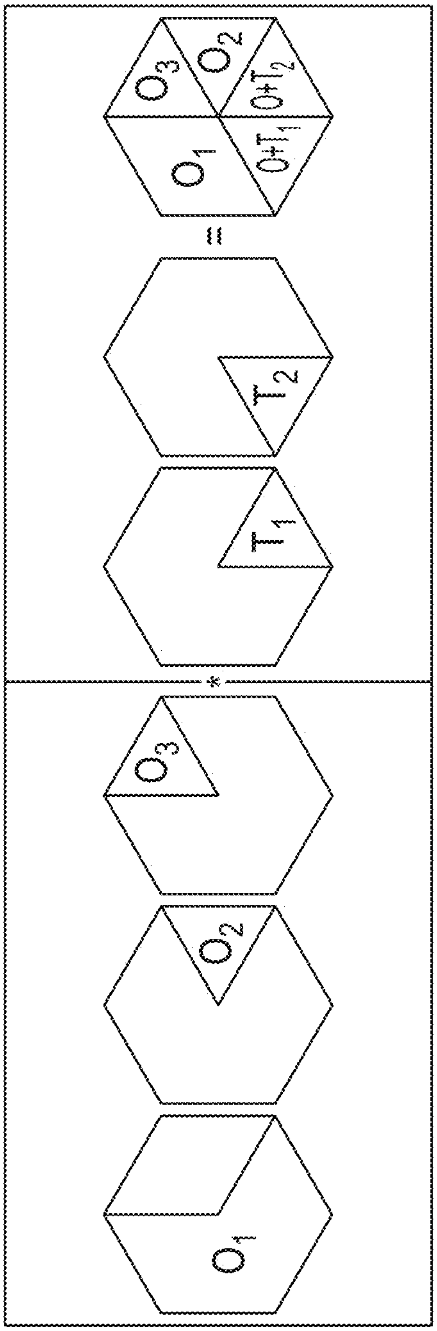
FIG. 23 is an illustration of a tenth implementation of a method of screen printing an image.

Referring to FIG. 23, a tenth implementation of a method of screen printing an image is illustrated. The method of FIG. 23 is similar to the method of FIG. 22 with the major exception that the method of FIG. 23 includes printing a semi-opaque base that includes a first semi-opaque ink O1, a second semi-opaque ink O2, and a third semi-opaque ink O3. In particular implementations, the first semi-opaque ink O1 may be yellow, the second semi-opaque ink O2 may be cyan, and the third semi-opaque ink O3 may be magenta. In other implementations, O1, O2, and O3 may be any other primary colored semi-opaque ink.

In various implementations, the method may include curing the semi-opaque base.

In various implementations, the method may include screen printing a first semi-transparent ink T1 over the first semi-opaque ink O1. The first semi-transparent ink may be any primary color different from the first semi-opaque ink O1. In implementations where the first semi-opaque ink O1 is yellow, the first semi-transparent ink may be cyan or magenta. In various implementations, and as illustrated by FIG. 23, in various implementations the method may include screen printing a second semi-transparent ink T2 over the first semi-opaque ink O1. The second semi-transparent ink may be a color different from the first semi-opaque ink O1 and the first semi-transparent ink T1.

As illustrated by FIG. 23, in various implementations the first semi-transparent ink T1 and the second semi-transparent ink T2 may overlie only the first semi-opaque ink O1. In such implementations, the second semi-opaque ink O2 and the third semi-opaque ink O3 may not include any semi-transparent inks printed thereon.

In various implementations, the method may include screen printing a semi-opaque secondary color that may be part of the semi-opaque base or may be spot printed over the semi-opaque base. In particular implementations where the second semi-opaque ink O2 and the third semi-opaque ink O3 are magenta and cyan, the semi-opaque secondary color may be violet and may be printed where the semi-opaque cyan ink and the semi-opaque magenta ink would intersect or overlap. In other implementations, the semi-opaque secondary color may be any other color.

Still referring to FIG. 23, the method may be capable of resulting in an image including five out of six primary and secondary colors (with the five colors illustrated as O1, O2, O3, O+T1, and O+T2. The method may also be capable of achieving 83.3% of the CMYK gamut. In implementations where the violet ink is spot printed, the method may be capable of achieving the entire CMYK gamut.

Figure 24:
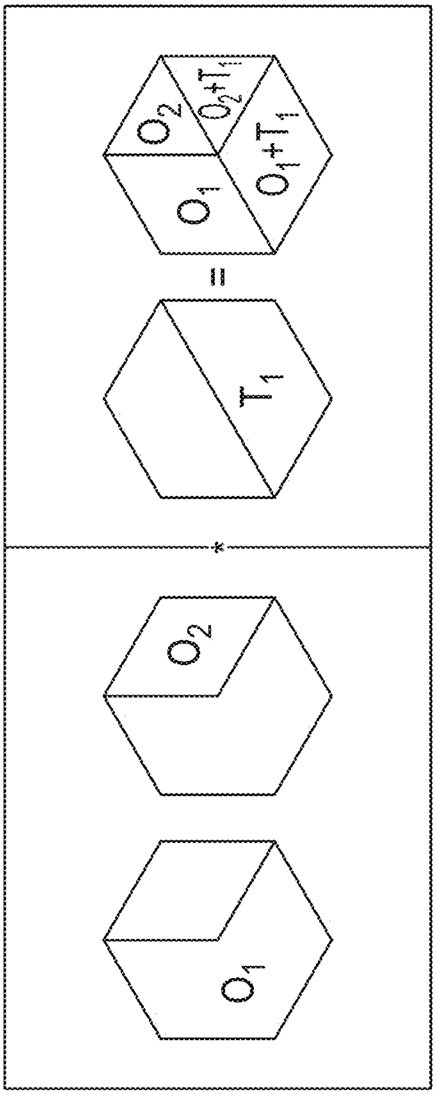
FIG. 24 is an illustration of an eleventh implementation of a method of screen printing an image.

Referring to FIG. 24, an eleventh implementation of a method of screen printing an image is illustrated. The method illustrated by FIG. 24 may be similar to the method illustrated by FIG. 22 with the primary difference being that the semi-opaque base may include two primary colored inks and a single semi-transparent ink may be printed thereon. More specifically, in various implementations the method includes printing a semi-opaque base onto a substrate. The semi-opaque base may include a first subtractive primary colored semi-opaque ink O1 and a second subtractive primary colored semi-opaque ink O2. The first semi-opaque ink O1 and the second semi-opaque ink O2 may be any of a yellow, magenta, or cyan ink.

In various implementations the method may include curing the semi-opaque base.

In various implementations the method may include screen printing at least one semi-transparent ink T1 over the semi-opaque base. In such implementations, the semi-transparent ink T1 may include a primary color different from O1 and O2 and may overlie one of or both O1 and O2. In such implementations, the method may be capable of resulting in an image including four out of six primary and secondary colors (with the four colors illustrated as O1, O2, O1+T1, and O2+T1. The method may also be capable of achieving 66.6% of the CMYK gamut.

Figure 25:
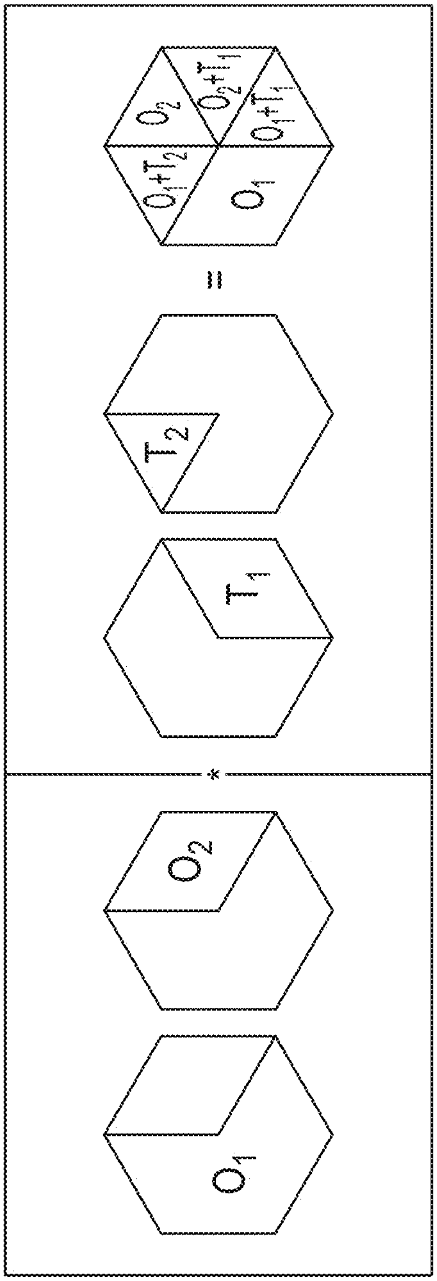
FIG. 25 is an illustration of a twelfth implementation of a method of screen printing an image.

Referring to FIG. 25, a twelfth implementation of a method of screen printing an image is illustrated. The method illustrated by FIG. 25 may be similar to the method illustrated by FIG. 24 with the primary difference being that two semi-transparent inks may be printed on the semi-opaque base. More specifically, in various implementations the method includes screen printing a semi-opaque base onto a substrate. The semi-opaque base may include a first subtractive primary colored semi-opaque ink O1 and a second subtractive primary colored semi-opaque ink O2. The first semi-opaque ink O1 and the second semi-opaque ink O2 may be any of a yellow, magenta, or cyan ink.

In various implementations the method may include curing the semi-opaque base.

In various implementations the method may include screen printing a first semi-transparent ink T1 over the semi-opaque base. In such implementations, the semi-transparent ink T1 may include a primary color different from O1 and O2 and may overlie one of or both O1 and O2. The method may also include screen printing a second semi-transparent ink T2 over the semi-opaque base. In such implementations, the semi-transparent ink T2 may include a primary color different from O1 and may overlie O1. In such implementations, the method may be capable of resulting in an image including five out of six primary and secondary colors (with the five colors illustrated as O1, O2, O1+T1, O1+T2, and O2+T1. The method may also be capable of achieving 83.3% of the CMYK gamut.

In various implementations, the screen angles of the varying screens may include a combination of the screens having the same screen angle and screens having screen angles that differ by thirty degrees. In other implementations, the screen angles may differ by more or less than 30 degrees. In particular implementations, the white under-base may be printed at an angle of 82.5 degrees, the white highlight layer may be printed at an angle of 82.5 degrees, the semi-opaque yellow ink may be printed at an angle of 82.5 degrees, the semi-opaque magenta ink may be printed at an angle of 52.5 degrees, the process yellow ink may be printed at an angle of 82.5 degrees, the process cyan ink may be printed at an angle of 82.5 degrees, the process magenta ink may be printed at an angle of 82.5 degrees, the semi-opaque black ink may be printed at an angle of 82.5 degrees, and the black accent may be printed at an angle of 82.5 degrees. Such angles may be used in implementations where the mesh/screen interferences are at 90 degrees. In other implementations, the angles of each of these elements printed may be more or less than what is listed above.

Further, in implementations utilizing offset printing, any of the screens may include an angle of 45 degrees or 90 degrees.

The implementations of the methods of screen printing an image disclosed herein may be automated. In such implementations, the screen printer may autonomously print using any of the methods disclosed herein after receiving a request and instructions for printing a particular image. In various implementations, the method of generating an image to be printed may include generating the image on a platform utilizing imaging software. In various implementations, an image may be generated using the imaging software marketed under the tradename of Photoshop® of Adobe Systems Incorporated, a Delaware Corporation of San Jose California. In other implementations, other imaging software may be utilized to generate an image to be printed.

In various implementations, the method may include taking a raster file of a photograph or image to be printed and converting it to a CMYK format. The method may also include putting the image on a single transparent layer and eliminating all background material to ensure that the only image that is generated is the image to be printed. Upon converting the image to a CMYK format, a source cyan channel, a source magenta channel, and/or a source yellow channel for the image may be generated. As used herein, "channel" is defined as stored color information about an image. In various implementations, the method includes generating a semi-opaque cyan channel from the source cyan channel. The semi-opaque cyan channel includes all the color information corresponding to the areas of the image created through the semi-opaque cyan color. In implementations where the image does not include a need for semi-transparent cyan channel, the cyan portion of semi-opaque cyan channel may include the same information in the cyan source channel. In implementations where the image does include a need for a semi-transparent cyan channel, the semi-opaque cyan channel may be generated through subtractively removing the portion of the source cyan channel corresponding with the semi-transparent cyan channel.

In various implementations, the method may include generating a semi-opaque magenta channel from the source magenta channel. The semi-opaque magenta channel includes all the color information corresponding to the areas of the image created through the semi-opaque magenta color. In implementations where the image does not include a need for semi-transparent magenta channel, the magenta portion of semi-opaque magenta channel may include the same information in the magenta source channel. In implementations where the image does include a need for a semi-transparent magenta channel, the semi-opaque magenta channel may be generated through subtractively removing the portion of the source magenta channel corresponding with the semi-transparent magenta channel.

In various implementations, the method includes generating a semi-opaque yellow channel from the source yellow channel. The semi-opaque yellow channel includes all the color information corresponding to the areas of the image created through the semi-opaque yellow color. In implementations where the image does not include a need for semi-transparent yellow channel, the yellow portion of semi-opaque yellow channel may include the same information in the yellow source channel. In implementations where the image does include a need for a semi-transparent yellow channel, the semi-opaque yellow channel may be generated through subtractively removing the portion of the source yellow channel corresponding with the semi-transparent yellow channel.

In various implementations, the method may also include generating a white under-base channel. In such implementations, the method may also include generating a white highlight layer channel. The white under-base channel or white highlight channel may be generated for images intended to be printed on black or colored substrate.

In various implementations, the method may include generating a source key channel, or black channel, from the CMYK file corresponding to portions of the image to be generated that are black. The black source channel may be a semi-opaque channel.

In various implementations, the method includes generating either a process (or semi-transparent) cyan channel and a process magenta channel, a process cyan channel and a process yellow channel, or a process magenta channel and a process yellow channel. In various implementations, only two process channels may be generated. The process channels may be generated through taking the inverse, or the portion removed from, the semi-opaque channels of two of the three semi-opaque channels. In various implementations, the two process channels created may correspond in color to the two semi-opaque channels having the least amount of color.

In various implementations, the method of generating the image includes generating a semi-opaque base of the image through applying the semi-opaque cyan channel, the semi-opaque magenta channel, and/or the semi-opaque yellow channel. In implementations corresponding to a method of printing where the semi-opaque base does not include all three primary colors, as disclosed herein, the method of generating the image may include generating only channels corresponding to the colors used in the base and generating the semi-opaque base with the channels generated. In implementations of methods including generating the first and/or white highlight layer channels, the semi-opaque base may be applied over the first and/or white highlight layer channels.

In various implementations, the method may include applying the two process channels generated over the semi-opaque base to create the image. The process channels are used to generate the secondary colors of the image. In implementations where only a single process ink is used in printing the image, as disclosed herein, the method of generating the image may include generating only a single process channel and applying the single process channel over the semi-opaque base to create the image. In various implementations, the method may also include varying the dot gain or other parameters of any of the channels. Through the interaction of the primary colored process channels and the primary colored semi-opaque channels, the entire CMYK gamut of colors may be achieved. Accordingly, images may be generated having a photo like quality.

In various implementations, the method also includes applying the key channel, or black channel, over the image. In such implementations, the method may include subtractively removing portions of the white under-base channel or channels, the semi-opaque base, and the process channels that lie under the black portions of the black channel. The removal of the portions under the black channel may be referred to as grayscale color removal (GCR) or under color removal (UCR). Through removing the portions of the channels under the portions of the black channel, the amount of ink printed when later printing the image may be conserved. Further, in implementations including the white under-base channel(s), the white under-base channel(s) may form the white portions of the image. In such implementations, the semi-opaque base, the process channels, and the black channel do not cover the portions of the white under-base channel(s) forming the white portions of the image.

In various implementations, one or more other opaque colors may be applied to predetermined areas of the image in order to accentuate particular colors. Upon the image being generated, the image and instructions for printing the image may be transferred to a print model, where the particular screens corresponding to the image to be printed may be created. The particular screens may then be utilized in a screen printer using any method disclosed herein.

Figure 9:
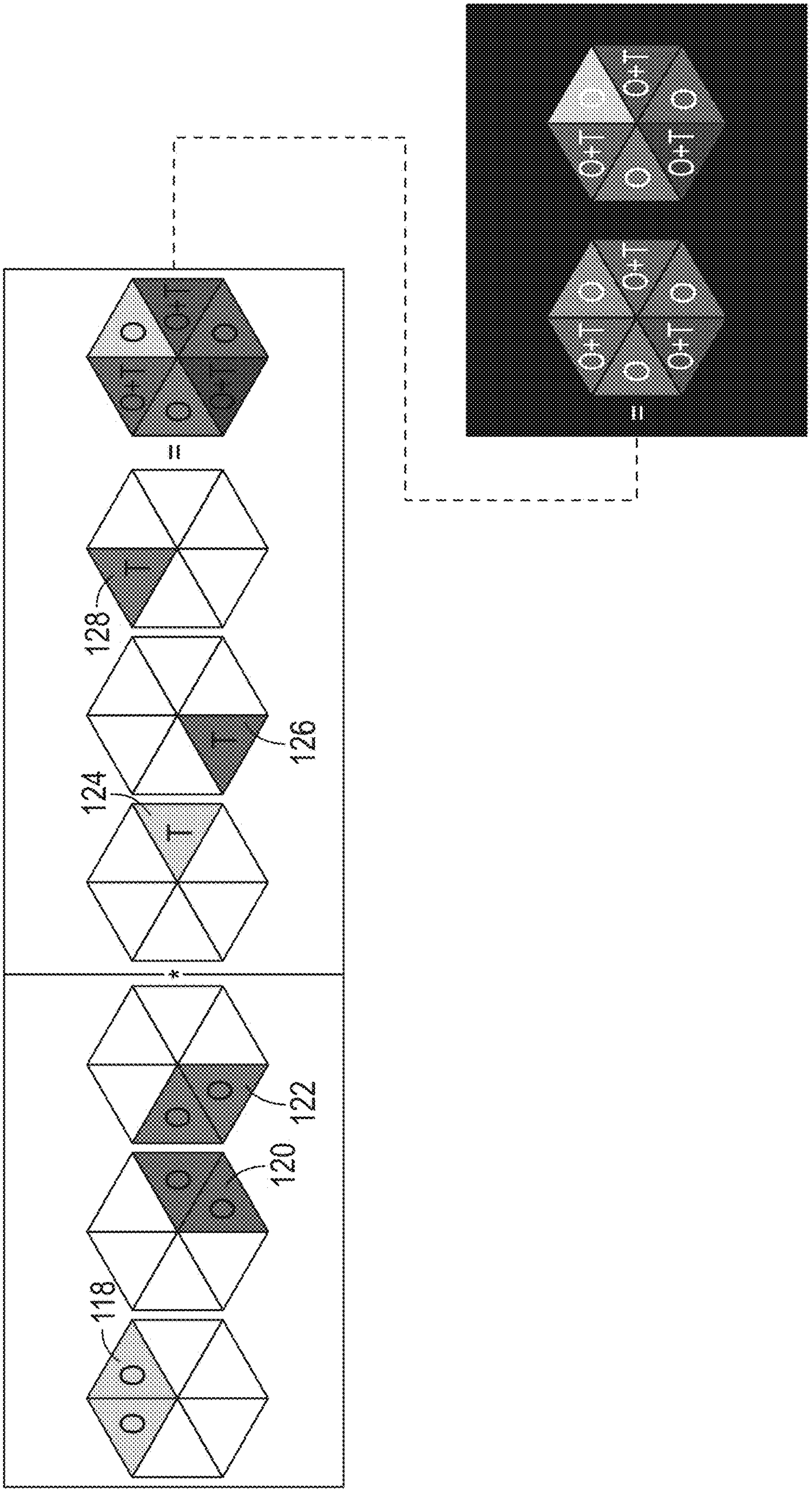
FIG. 9 is an illustration of an eighth implementation of a method of screen printing an image.
Figure 12:
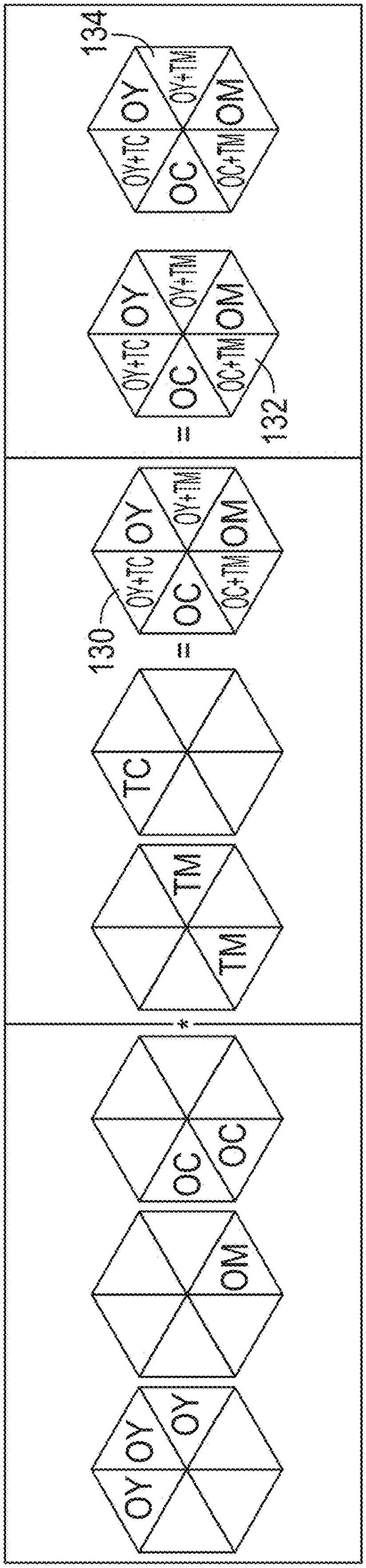
FIG. 12 is an illustration of the implementation of FIG. 2 without illustrating the color.
Figure 13:
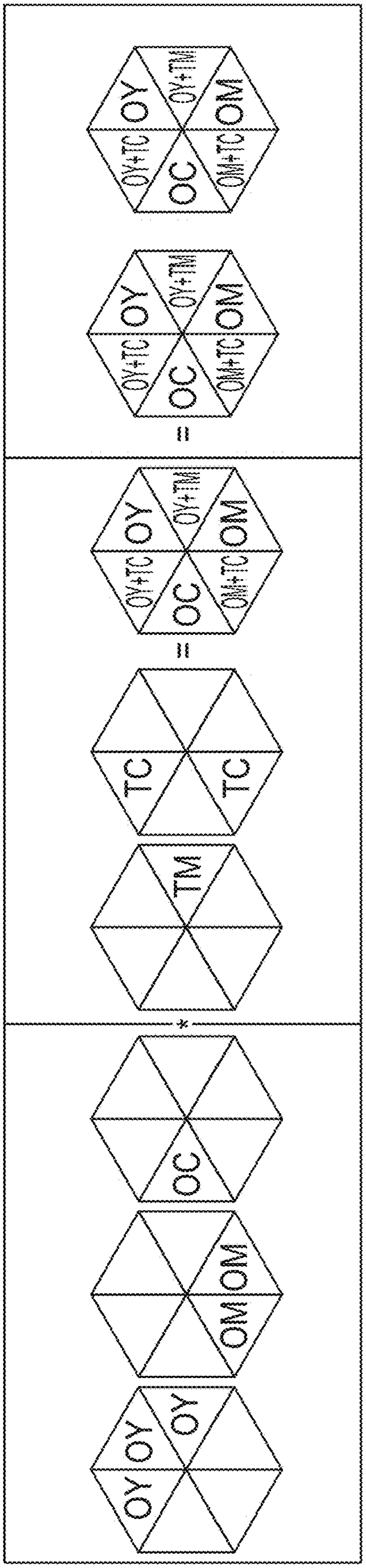
FIG. 13 is an illustration of the implementation of FIG. 3 without illustrating the color.
Figure 14:
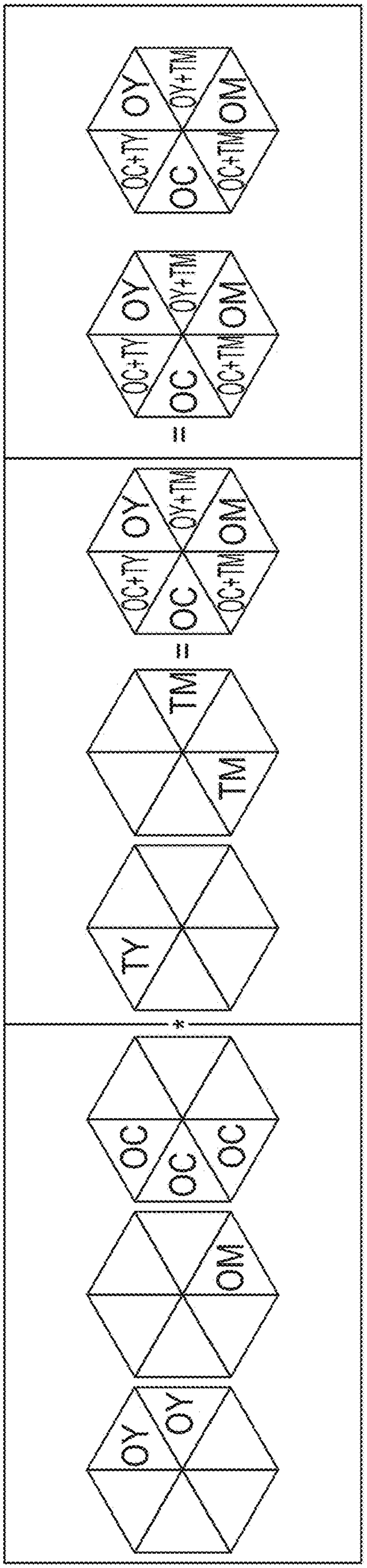
FIG. 14 is an illustration of the implementation of FIG. 4 without illustrating the color.
Figure 15:
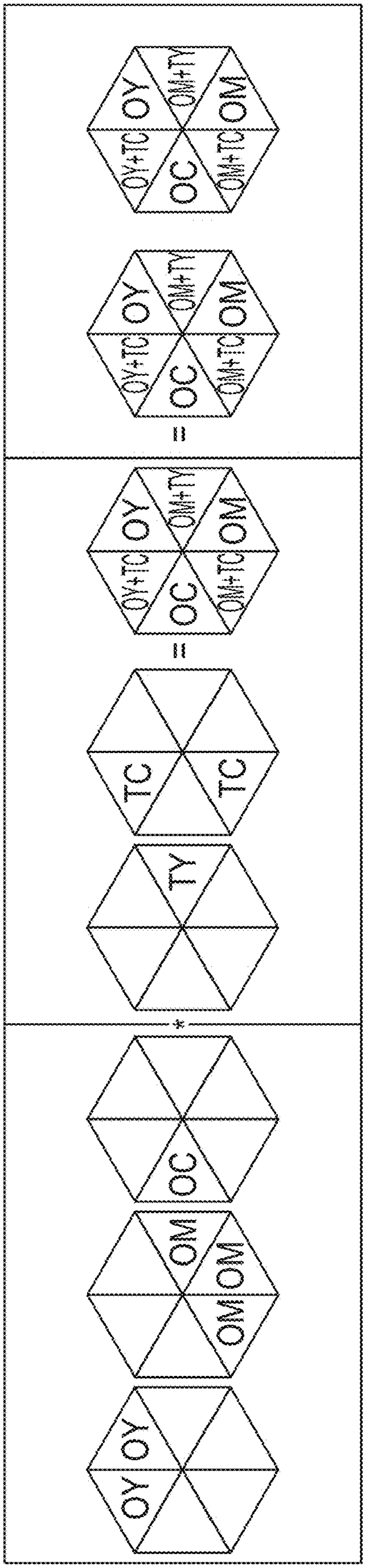
FIG. 15 is an illustration of the implementation of FIG. 5 without illustrating the color.
Figure 16:
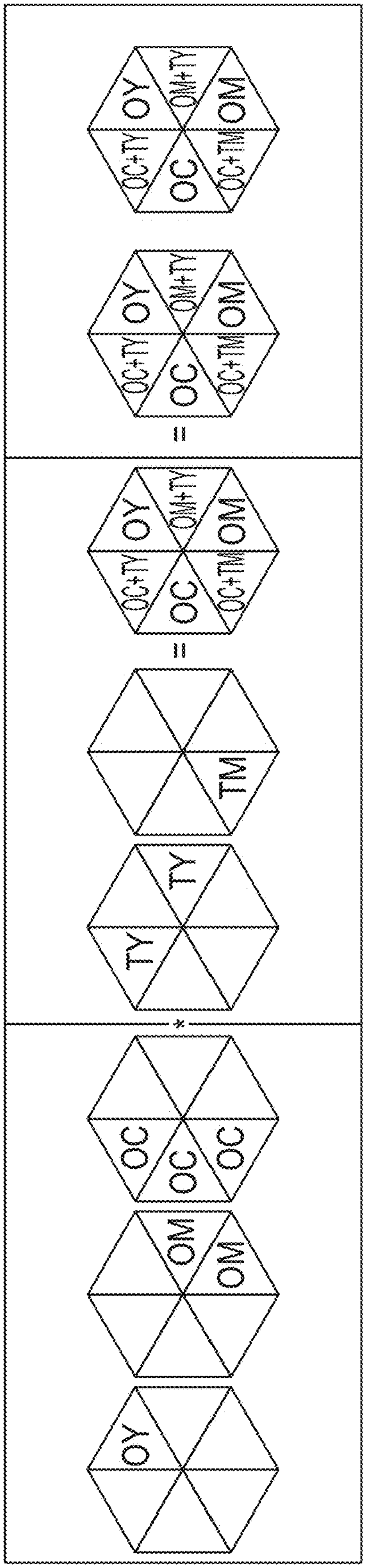
FIG. 16 is an illustration of the implementation of FIG. 6 without illustrating the color.
Figure 17:
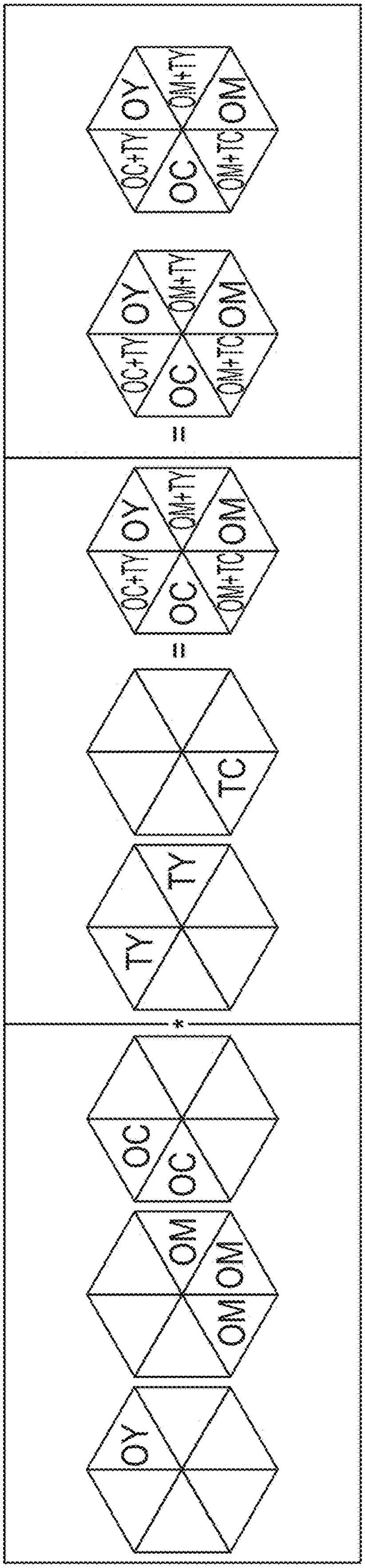
FIG. 17 is an illustration of the implementation of FIG. 7 without illustrating the color.
Figure 18:
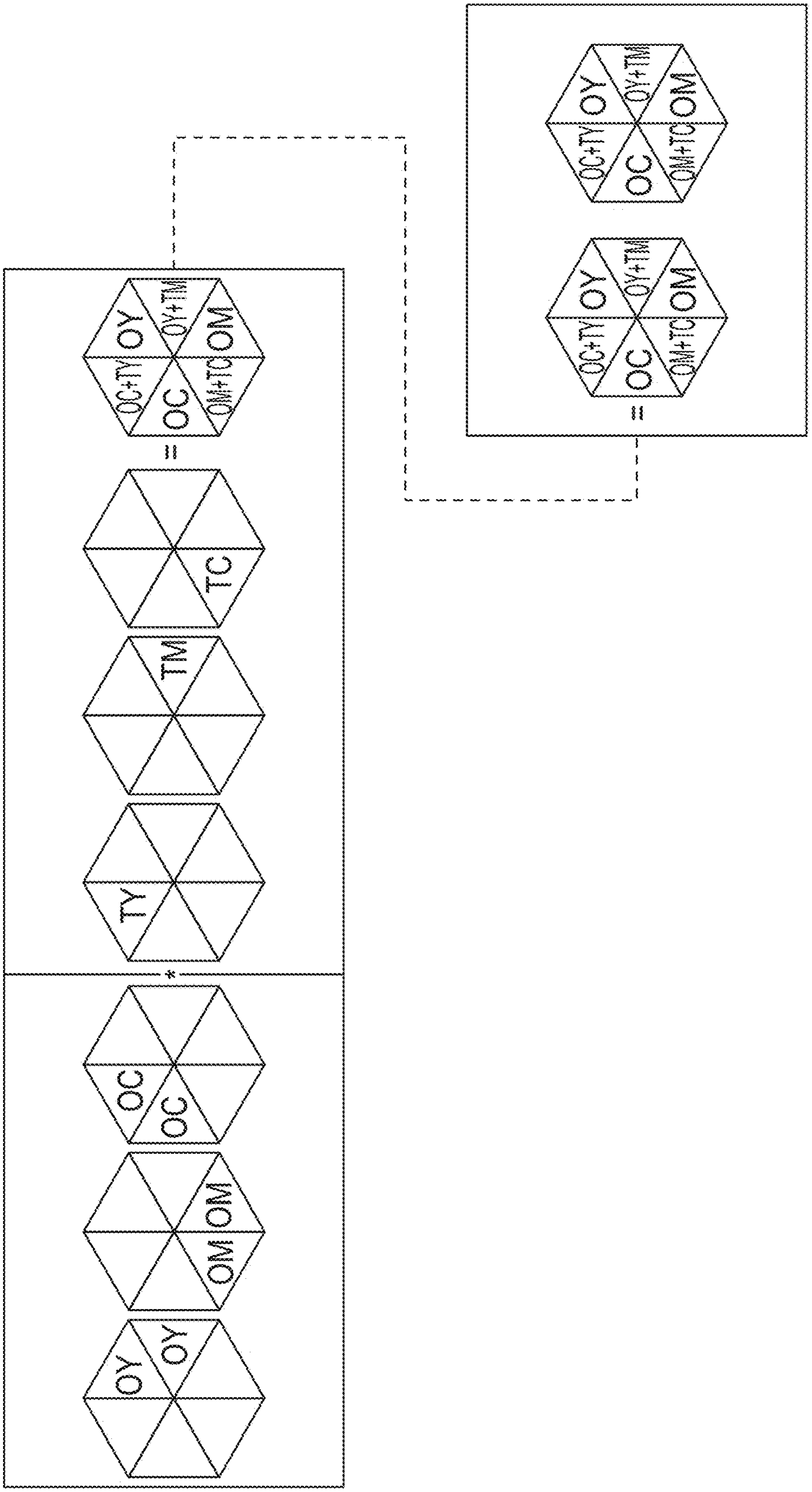
FIG. 18 is an illustration of the implementation of FIG. 8 without illustrating the color.
Figure 19:
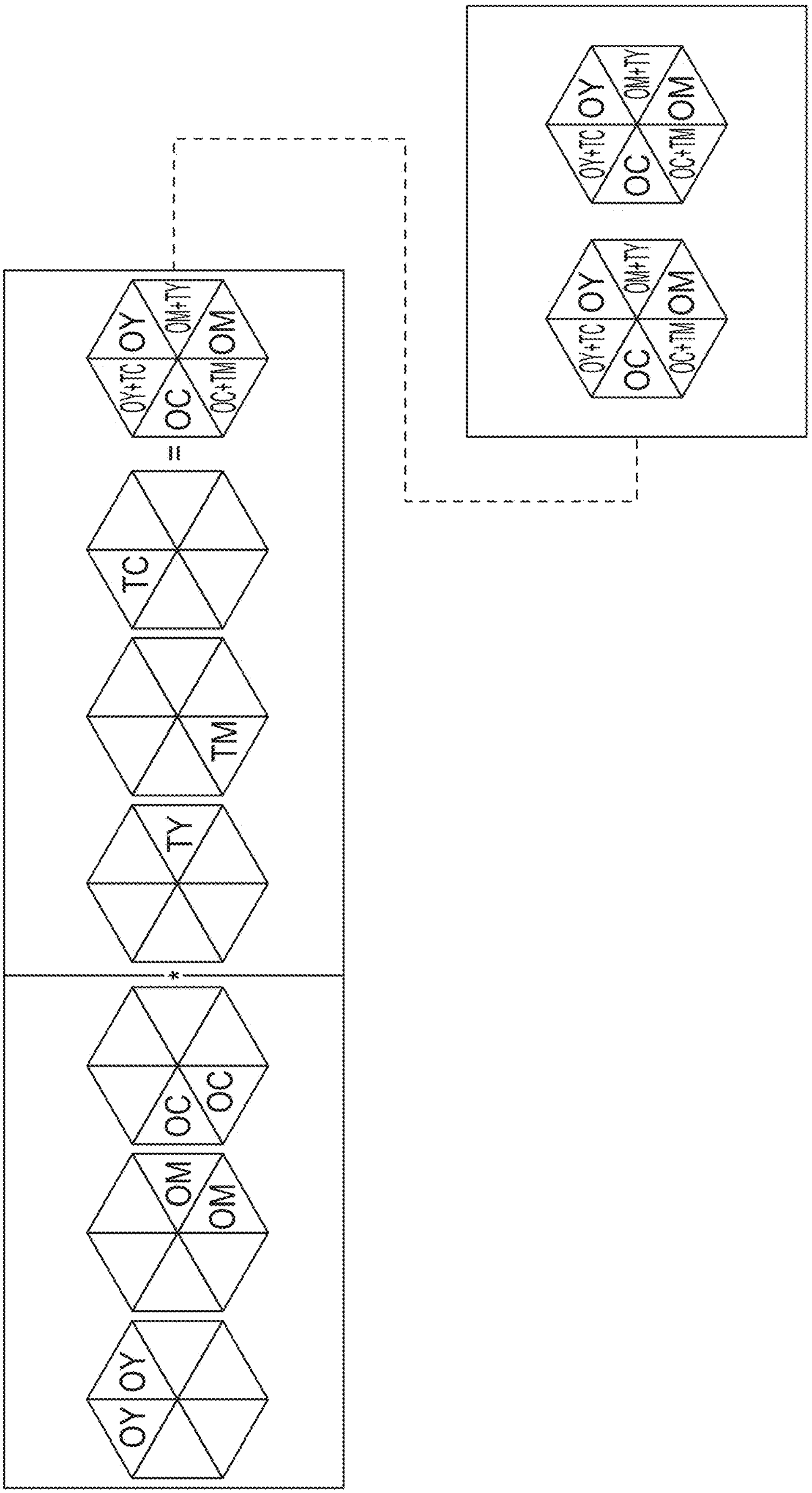
FIG. 19 is an illustration of the implementation of FIG. 9 without illustrating the color.
Figure 20:
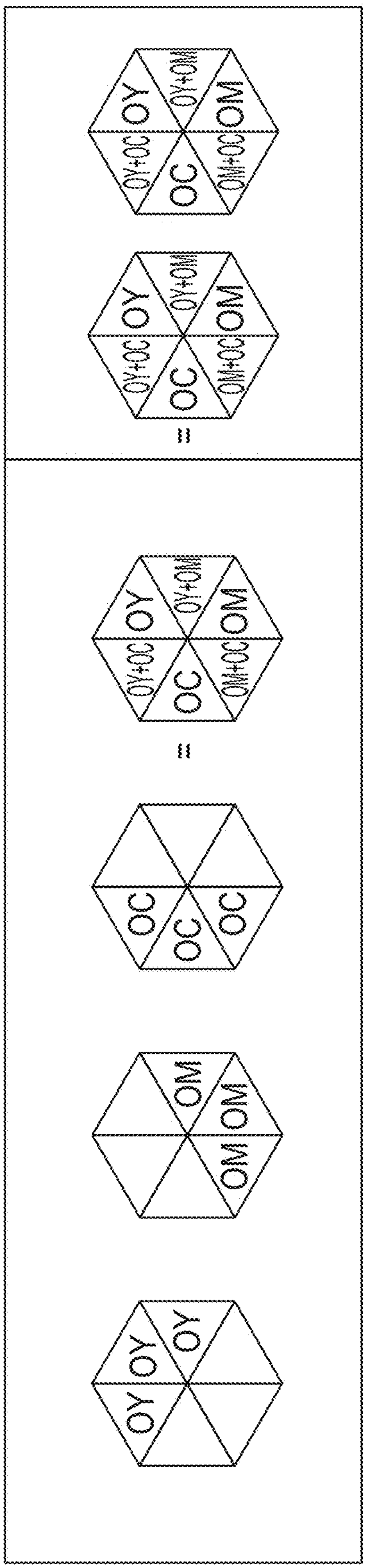
FIG. 20 is an illustration of the implementation of FIG. 10 without illustrating the color.
Figure 21:
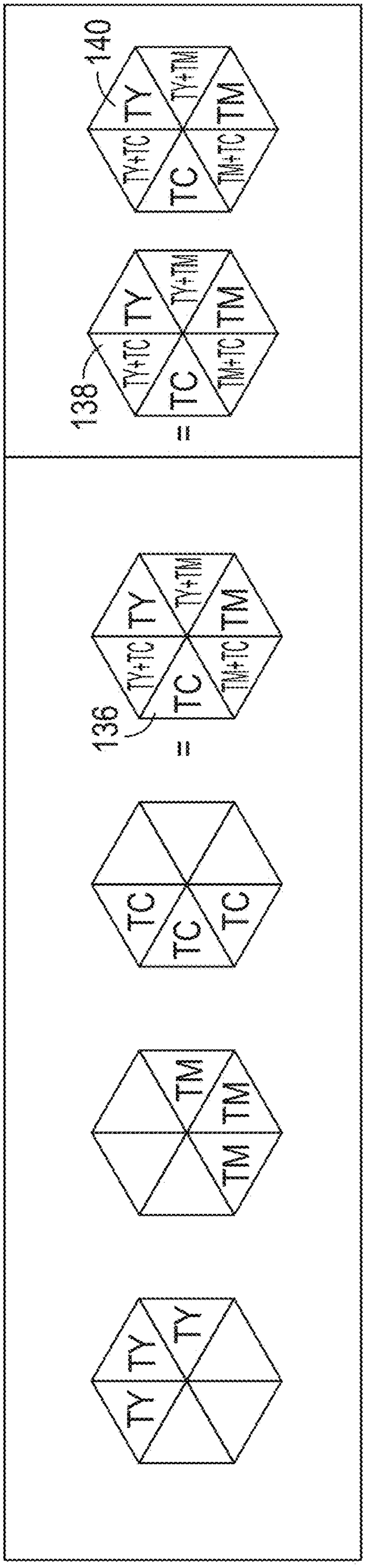
FIG. 21 is an illustration of the implementation of FIG. 11 without illustrating the color.

Referring to FIGS. 12-21, illustrations corresponding to the methods illustrated by FIGS. 2-11 are illustrated without the colors being illustrated. More specifically, FIG. 12 is a black and white line drawing of FIG. 2, FIG. 13 is a black and white line drawing of FIG. 3, FIG. 14 is a black and white line drawing of FIG. 4, FIG. 15 is a black and white line drawing of FIG. 5, FIG. 16 is a black and white line drawing of FIG. 6, FIG. 17 is a black and white line drawing of FIG. 7, FIG. 18 is a black and white line drawing of FIG. 8, FIG. 19 is a black and white line drawing of FIG. 9, FIG. 20 is a black and white line drawing of FIG. 10, and FIG. 21 is a black and white line drawing of FIG. 11. Each of FIGS. 12-21 are labeled to indicate the color of the particular portion of the figure. As an example, referring to FIG. 12, "OY" refers to semi-opaque yellow, "OM" refers to semi-opaque magenta, and "OC" refers to semi-opaque cyan. Similarly, "TM" refers to semi-transparent magenta, "TC" refers to semi-transparent cyan, and "TY" (though not illustrated by FIG. 12) refers to semi-transparent yellow. As illustrated by image 130, the OC portion of the image is cyan, the OY portion of the image is yellow, and the OM portion of the image is magenta. Further, due to the overlaying semi-transparent inks, the OY+TC portion of the image generates a green color, the OY+TM portion of the image generates a red color, and the OC+TM portion of the image generates a purple or violet color. Image 132 is a depiction of image 130 on a black substrate. Due to the black substrate, image 132 is more obscured due to the background. Image 134 is an example of the same image as 130 and 132 with the difference being that image 134 has a white under-base on a black substrate, resulting in truer colors in image 134 than in image 132. As used throughout FIGS. 13-19, the OM+TC portions refer to a purple or violet color, the OC+TY portions refer to a green color, and the OM+TY portions refer to a red color. Each of FIGS. 13-19 show the same three produced images, with one image over a white substrate, another image over a black substrate, and the furthest most right image over a white under-base on a black substrate.

Referring to FIG. 20, the OY+OC portion results in a substantially cyan color due to the solidity of the cyan ink, the OY+OM portion results in a substantially magenta color due to the solidity of the ink, and the OM+OC portion results in a substantially cyan color due to the solidity of the ink. Accordingly, while the image can be seen on a light or dark substrate, secondary colors cannot be created with the use of only semi-opaque yellow, semi-opaque magenta, and semi-opaque cyan in. Referring to FIG. 21, the TY+TC portion results in a green color, the TY+TM portion results in a red color, and the TM+TC portion results in a purple or violet color. Thus, while the combination of semi-transparent inks can result in the full CMYK gamut of colors on a white substrate (as illustrated by image 136), when the image is placed on a black substrate, such as image 138, the black substrate is seen through the semi-transparent inks making the image hardly discernable. Even when the image is printed on a white under-base over the black substrate, such as image 140, much of the black substrate is still seen through the image preventing the printing of true colors and a clear image.

While the implementations disclosed herein are described for screen printing, it is understood that the principle of printing semi-transparent ink over a semi-opaque base according to the methods disclosed herein may be utilized in other implementations.

In places where the description above refers to particular implementations of screen printing and image generating methods and implementing components, sub-components, methods and sub-methods, it should be readily apparent that a number of modifications may be made without departing from the spirit thereof and that these implementations, implementing components, sub-components, methods and sub-methods may be applied to other screen printing and image generating methods.

What is claimed is:

1. A method of screen printing an image comprising:
- screen printing a subtractive primary colored semi-opaque ink onto a substrate;
- screen printing a first subtractive primary colored semi-transparent ink over the semi-opaque ink; and
- screen printing a second subtractive primary colored semi-transparent ink over the semi-opaque ink;
- wherein the method is capable of achieving three out of six primary and secondary colors.

2. The method of claim 1, wherein six or fewer screens are used in printing the image.

3. The method of claim 1, wherein the substrate printed upon is one of colored or black.

4. The method of claim 1, further comprising printing a second subtractive primary colored semi-opaque ink and a third subtractive primary colored semi-opaque ink onto the substrate.

5. The method of claim 1, further comprising spot printing a second subtractive primary colored semi-opaque ink.

6. The method of claim 1, further comprising printing a white under-base onto the substrate.

7. The method of claim 1, further comprising curing the subtractive primary colored semi-opaque ink.

8. A method of screen printing an image comprising:
- screen printing a semi-opaque base onto a substrate, the semi-opaque base comprising two of a semi-opaque yellow ink, a semi-opaque magenta ink, or a semi-opaque cyan ink; and
- screen printing at least one of a process cyan ink, a process magenta ink, or a process yellow ink onto the semi-opaque base;
- wherein the method of screen printing is capable of achieving four out of six primary and secondary colors.

9. The method of claim 8, wherein no more than two process inks are used in the method.

10. The method of claim 8, wherein eight or fewer screens are used in printing the image.

11. The method of claim 8, further comprising printing a white under-base onto the substrate, wherein the substrate is one of colored or black.

12. The method of claim 8, further comprising curing the semi-opaque base.

13. A method of screen printing an image comprising:
- screen printing a semi-opaque base onto a substrate, wherein the semi-opaque base comprises a semi-opaque yellow ink; and screen printing a process cyan ink and a process magenta ink onto the semi-opaque base;

wherein the method of screen printing is capable of achieving a yellow color, a green color, and an orange color.

14. The method of claim 13, wherein the semi-opaque base further comprises a semi-opaque cyan ink.

15. The method of claim 13, wherein the semi-opaque base further comprises a semi-opaque magenta ink.

16. The method of claim 13, wherein the semi-opaque base further comprises a semi-opaque cyan ink and a semi-opaque magenta ink.

17. The method of claim 16, wherein the process cyan ink and the process magenta ink only overlie the semi-opaque yellow ink.

18. The method of claim 16, further comprising spot printing a semi-opaque violet ink.

19. The method of claim 18, wherein the method is capable of achieving an entire CMYK gamut of colors.

20. The method of claim 13, further comprising curing the base.

* * * * *